United States Patent
Whatmore et al.

(10) Patent No.: US 7,112,267 B2
(45) Date of Patent: Sep. 26, 2006

(54) ELECTRIC-FIELD STRUCTURING OF COMPOSITE MATERIALS

(75) Inventors: Roger W Whatmore, Cranfield (GB); Steve A Wilson, Cranfield (GB)

(73) Assignee: Qinetiq Limited, Farnborough, Hants (GB)

( * ) Notice: Subject to any disclaimer, the term of this patent is extended or adjusted under 35 U.S.C. 154(b) by 454 days.

(21) Appl. No.: 10/257,249

(22) PCT Filed: Apr. 10, 2001

(86) PCT No.: PCT/GB01/01596

§ 371 (c)(1),
(2), (4) Date: Oct. 10, 2002

(87) PCT Pub. No.: WO01/76852

PCT Pub. Date: Oct. 18, 2001

(65) Prior Publication Data

US 2004/0026249 A1  Feb. 12, 2004

(30) Foreign Application Priority Data

Apr. 11, 2000 (GB) .................................. 0008816.1

(51) Int. Cl.
*B03B 5/00* (2006.01)
*C25B 9/12* (2006.01)

(52) U.S. Cl. ..................... 204/547; 204/643; 204/650

(58) Field of Classification Search ................ 204/547, 204/643, 650
See application file for complete search history.

(56) References Cited

U.S. PATENT DOCUMENTS 3,784,460 A * 1/1974 Le Bras et al. ............. 204/623
4,357,222 A * 11/1982 Lucek ......................... 204/472
4,422,003 A   12/1983 Safari et al.
4,688,900 A   8/1987 Doane et al.
4,728,845 A   3/1988 Haun et al.
5,194,181 A   3/1993 Reitz
5,232,639 A   8/1993 Reitz et al.
5,589,047 A * 12/1996 Coster et al. ............... 204/450
5,948,328 A   9/1999 Fiedler et al.

(Continued)

FOREIGN PATENT DOCUMENTS

WO   01/05512 A1   7/2000

OTHER PUBLICATIONS

Bowen et al., "Dielectric properties of dielectrophoretically assembled particulate-polymer composites", J. Materials Research, vol. 13, No. 1, Jan. 1998, pp. 205-210.*

(Continued)

*Primary Examiner*—Kishor Mayekar
(74) *Attorney, Agent, or Firm*—Nixon & Vanderhye P.C.

(57) ABSTRACT

A method and apparatus for the spatial distribution of a filler component within the matrix of a composite material. An electric field is applied to a mixture consisting of two or more components that have different dielectric permittivities, at least one of which is initially in the form of a liquid polymer or pre-polymer. An alternating electric field is established between a pair of electrical conductors or electrodes that are moved relative to each other, so as to alter the spatial intensity of the electric field in a controlled manner. Polarized particles or elements of the filler component that are coupled to a moving electrode by a dielectrophoretic force can consequently be dragged into a predetermined spatial configuration. As the size of the inter-electrode gap is changed, the applied voltage can be adjusted in order to maintain electrically induced polarization of the filler component.

9 Claims, 4 Drawing Sheets

U.S. PATENT DOCUMENTS 6,048,622 A    4/2000  Hagood, IV et al.

OTHER PUBLICATIONS

Fiedler et al; "Electrocasting Formationa DN Structuring of Suspended Microbodies Using A.C. Generated Field Cages", 1995, Springer Verlag, Microsystem Technologies 2, Germany, XP000199394.

WPI Accession No. 1988-104630[15] & SU1337924 A (Kamildzhanov) Sep. 15, 1987, see abstract.

Wilson et al; "Electric Field Structuring of Piezoelectric Composite Materials"; Journal of the Korean Physical Society, vol. 32, Feb. 1998, pp. S1204-S1206.

* cited by examiner

ELECTRIC-FIELD STRUCTURING OF COMPOSITE MATERIALS

The present invention relates to a method and apparatus used to exercise control over the spatial distribution of a first component within a second component of a composite material.

BACKGROUND OF THE INVENTION

Many composite materials are commercially available which consist of a second component, for example a filler, distributed within a first component, referred to as the matrix material. In general terms, the filler component comprises one or more materials having mechanical, thermal, electrical or magnetic properties that differ significantly from those of the matrix material. When the components are combined, a composite material is formed that has physical properties unlike those of either the filler or the matrix. The properties of the composite material can be varied and controlled by changing the relative amounts or volume fractions of the components. If the filler component is randomly distributed within the matrix then, typically, the physical properties of the composite are independent of the orientation of one component within the other of the material. Such a material is said to have isotropic properties. Alternatively, if the spatial distribution of the filler component is controlled, then it is possible to make composites having physical properties that vary according to the orientation of the material. Structural fibreglass composites are a good example of the latter. The glass fibres can be deliberately aligned, parallel to the direction of an applied force, in order to take advantage of the relatively high tensile strength and stiffness that they have in comparison to the matrix. This composite is stronger in one direction and is said to have anisotropic properties.

In 'Connectivity and Piezoelectric-Pyroelectric Composites' Mat. Res. Bull. 13 pp525–536 (1978), Newnham R. E et al, the descriptive term connectivity was used to classify the distribution of the constituents in composite materials. An index number is assigned to each component according to the number of dimensions in which it is physically self-connected. A thin rod is said to be self-connected in one dimension and no other. A continuous matrix is self-connected in three dimensions. Using this terminology, a composite consisting of an array of aligned rods of filler material held by a continuous matrix is referred to as a 1-3 composite. Where individual filler particles are uniformly dispersed in a continuous matrix, they are said to be physically self-connected in no dimension. This type of material is referred to as a 0-3 composite.

Piezoelectric composite materials, consisting of a ferroelectric ceramic in an electrically-inactive polymer matrix, provide an example whereby the spatial distribution of the second component has a fundamental influence on physical properties. Both 0-3 type and 1-3 type composites are routinely used for passive sensors. The 0-3 type have adequate sensitivity and have a cost advantage due to their simplicity of manufacture. Their greater flexibility and formability make them the preferred choice for large area applications such as sonar. Composites with an 1-3 type connectivity are far more sensitive, but are also more expensive to make. They are preferred for active devices and for array-type sensors. Piezoelectric arrays are used for such applications as acoustic imaging and for medical ultrasound.

In array-type composites or 1-3 type composites, two of the key factors affecting properties are the size of the individual elements of the second component and the distance between those elements, referred to as the periodicity. In production, steps must be taken to ensure that these factors are controllable within specified limits. A commonly used technique utilises precision micro-machining to accurately cut individual array elements from a solid ceramic block. Arrays have also been made by injecting ceramic powder, or powder in suspension, into a mould under pressure. The resulting pre-form of the composite structure must then be sintered to consolidate the ceramic. In an alternative method, rods or 'fibres' can be aligned mechanically, by hand or otherwise, to produce a desired aligned structure. In practice this is difficult to achieve with the required precision due to the small scale of operations. Typically, the useful diameter of the rods lies in the range 30 to 400 microns. Once the desired structure of elements of the second component has been created it can then be bonded or embedded in a polymeric matrix to complete the composite material. Most commonly, a liquid pre-polymer is allowed to permeate the aligned structure and subsequently solidify. The term pre-polymer refers here to a compound or mixture of compounds that can undergo a chemical reaction to produce a polymeric solid. Alternatively, it is conceivable that a molten polymer could be allowed to permeate the aligned structure and then to solidify. Surface-active 'coupling agents' can be used to improve the useful properties of the composite by chemically modifying the interface between the filler and the matrix components.

In contrast, the production of 0-3 type composites is more straightforward. The filler or second component, in powder form, is mixed intimately with the first component, a liquid polymer or pre-polymer. The liquid wets the filler particles, before being made to polymerize or otherwise solidify. High volume fractions of filler are used and the composite is shaped by hot-pressing or warm-rolling. Ostensibly, a commercial 0-3 type composite consists of individual filler particles, each one being completely surrounded by a layer of the matrix material. In practice, the action of rolling or pressing often brings the particles into such close proximity that direct electrical contact may occur.

One method that could be used to induce a predetermined spatial distribution of the filler component in composites is referred to as dielectrophoretic assembly or electric-field structuring. In this process, a dispersion of filler particles in a liquid polymer or pre-polymer is exposed to a moderate a.c. electric field. Under suitable conditions, the filler particles become polarized and exhibit a mutually attractive force, which causes them to form chain-like structures between the electrodes. The liquid is then solidified by means of a chemical reaction or a change in temperature and the newly-formed structures are thereby fixed in place to form a composite material with anisotropic properties. This method has the potential advantage that materials having the sensitivity of 1-3 type composites could be made, whilst retaining some of the simplicity of the manufacture of 0-3 type composites.

The electric-field structuring technique utilises this dielectrophoretic force, which is responsible for an electrorheological effect. This is discussed in 'Induced Fibrillation of Suspensions'. Journal of Applied Physics 20 pp 1137–1140 (December 1949), Winslow W. M. and 'Dielectrophoresis: The Behaviour of Neutral Matter in Non-Uniform Electric Fields'. Cxnbridge University Press (1978), Pohl H. A. Various parameters affecting this are: the dielectrophoretic or polarization force, which is directed to produce the desired particle structure; viscous drag in the fluid, which resists particle motion; and sedimentation, which must be controlled. Alternating electric fields are used, by preference, to avoid electrophoresis. Applied electric-field strength is deliberately moderated to suppress such effects as electrically-induced turbulence in the fluid and accelerated curing of the polymer. Applied electric-field frequency is dictated by the dielectric properties of the fluid and the filler.

One of the major pitfalls associated with the electric-field structuring technique is sedimentation. Where particles of the filler component have a higher density than the surrounding fluid component, then they will fall out of suspension under the influence of gravity. The rate of sedimentation depends on particle size and shape and also on the viscosity of the surrounding fluid. In practice, the magnitude of the dielectrophoretic force can be set to overshadow viscous drag and also the effect of gravity. However, the forces acting on different sized particles are not of the same magnitude. This makes precise control over the shape of the electric-field-induced structures difficult and irregularities commonly occur. A further difficulty concerns the viscosity of the surrounding fluid, which is not constant over the course of the processing cycle. For example, thermosetting polymers such as epoxy resins exhibit a progressive increase in viscosity with time as polymerization proceeds. At the same time, the polymerization reaction itself is exothermic and generates heat. The fluid experiences a rise in temperature and consequently its viscosity decreases. Furthermore, the rate of reaction is increased at the higher temperature. These competing effects make precise control over fluid viscosity difficult to achieve. Accordingly, the rate of sedimentation of suspended particles is often uncertain.

In common with many composites, the interface between the filler and matrix components has a controlling influence on the physical properties of materials produced by electric-field structuring. The surface electrical properties of the filler particles, in particular, are of prime importance. Normally particles are completely surrounded by a layer of adsorbed polymer, giving true random 0-3 type connectivity within the matrix. Where these layers form insulating barriers between the particles, the useful electrical properties of the composite material can be adversely affected. Furthermore, where variations in the sizes of individual particles exist, chain branching in the field induced structure is found to occur. Anisotropy in the electrical properties will then be a function not only of the amount of filler, but also of the degree of this chain branching. In practice, some disparity in the spatial distribution of the filler particles is found to occur between otherwise identical composite samples. Hence, significant variability in the physical properties of composites prepared by electric-field structuring can normally be expected.

BRIEF SUMMARY OF THE INVENTION

This present invention is directed towards a method and apparatus for manufacturing a composite material which overcomes the problem of sedimentation, hitherto associated with the electric-field structuring of composite materials. A further objective is to provide a means of improving the useful physical properties of such materials by controlling the spatial distribution of the filler component within the matrix.

BRIEF DESCRIPTION OF THE DRAWINGS

The invention will now be described, by way of example only, and with reference to the figures, of which:

FIG. 2b—is a view of the FIG. 1 embodiment as the second electrode is withdrawn. Thus it shows a stage in the processing sequence following that shown in FIG. 2a.

Figure 1:
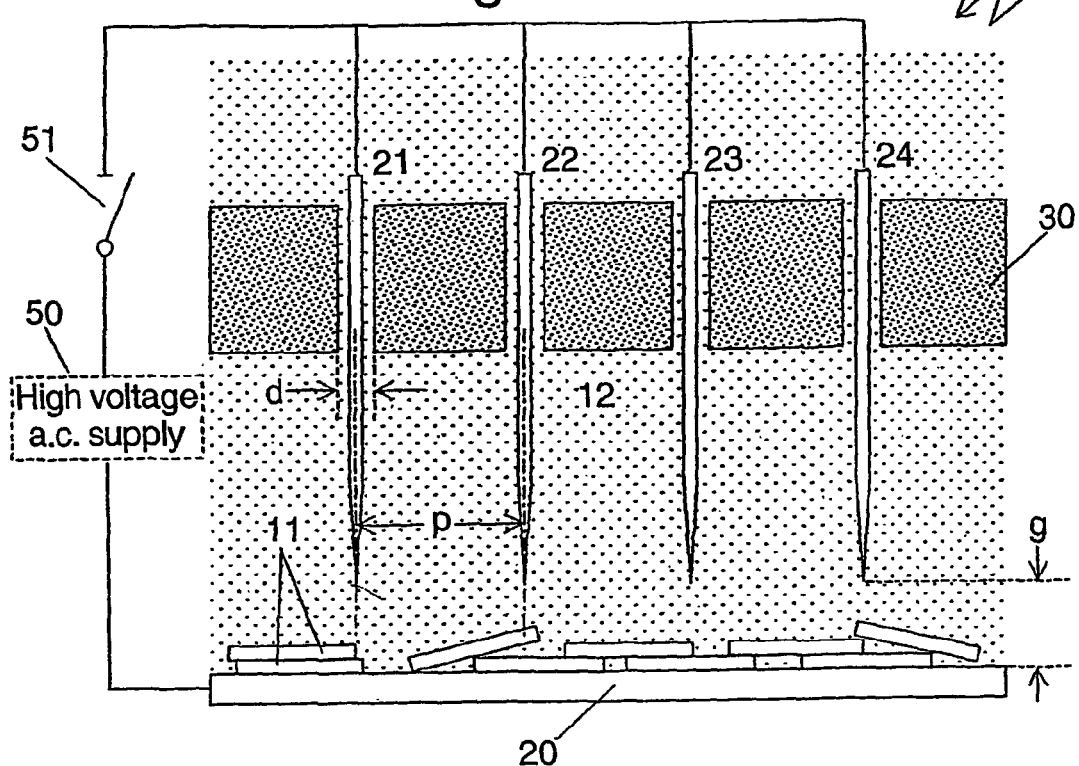
FIG. 1—is a schematic elevation illustrating an apparatus according to an embodiment of the present invention, immediately before an electric field is applied.

According to a first aspect, the invention comprises a method for the manufacture of composite materials including the steps of:

(a) adding a first composite component, comprising at least one non-conducting or weakly conducting fluid, to a receptacle;

(b) adding a second composite component, comprising at least one solid, liquid or gas capable of polarisation; whereby steps (a) and (b) can be carried out in either order;

(c) applying an alternating electric field across two electrodes immersed in the resultant mixture and wherein the two electrodes are moved relative to each other during the formation of the composite.

The first component and the second component have different dielectric permittivities as the first component is non-conducting or weakly conducting and the second component is capable of polarisation. Under suitable conditions, a dielectrophoretic force is induced by an applied electric field such that there is a mutual physical attraction between individual elements of the second component and also between elements of the second component and the electrodes. When one or more of the electrodes are physically moved relative to each other elements of the second component are dragged along, under the influence of the dielectrophoretic force, and can be redistributed within the surrounding fluid. Preferably, one of the electrodes is located in a fixed position at the base of the receptacle.

Preferably, means to pre-locate the second component within the first component prior to applying the electric field is provided. This means may be positioned at the base of the receptacle or between the two electrodes, immersed in the first component and may comprise a device which assists in the spatial redistribution of the second component. An example of such a device at the base of the receptacle could comprise an irregularity in the base surface of the receptacle.

Preferably, the second component is drawn through holes within a template during the relative movement between the two electrodes. The pattern of the holes within the template corresponds to the required pattern of the second component within the first component. This pattern is a function of the property requirements of the composite material.

Preferably, the second component contains more than one type of solid particle or filler. A further filler may comprise differently shaped particles of the same electrically polarizable material as the other filler or may be another electrically polarizable or non-polarizable material.

The second component may also comprise one or more types of liquid dispersed in the form of droplets or globules. On exposure to an electric field of suitable strength and frequency, polarized droplets of the second component form. If the second component were present as droplets or globules, these may coalesce into larger globules. If the conductivity of the second component exceeds that of the first component, the globules can be drawn out into elongated columnar structures by physical movement of the electrodes. Elongation is parallel to the direction of the applied field and the spatial distribution of the columns is controlled by the electrode configuration. As before, the newly-formed structures may be fixed in place by solidification or curing of the fluids concerned. Alternatively, if only the first component is solidified or cured then a second component can subsequently be removed to leave a series or an array of holes. The apparatus used in this embodiment may benefit from a template located between the electrodes as previously described. A variation of this technique exists whereby the dielectrophoretic force is used to draw columns of the second component, a miscible fluid, against the pull of gravity, from a pool of such liquid adjacent to the base electrode. A further variation of the technique exists when the conductivity of the second component is less than that of the first component. In this case, globules form that are flattened in a plane perpendicular to the direction of the applied field. Physical movement of the electrodes is utilized, as before, to dictate the spatial redistribution of the second fluid within base fluid before one or both are sofidified.

Preferably, the second component includes electrically-polarizable rods or fibres. These may be aligned within the first component achieving a predetermined spatial distribution. The length of the rods can be chosen so that they completely span the inter-electrode gap. Composites made in this way have no insulating barriers between the ends of the rods so the electrical properties of the second component can be fully utilised and true 1-3 type connectivity is achieved. Equally, composites made in this way can be sectioned after assembly so as to achieve this effect. This aspect of the invention is intended to preclude any adverse effect on the physical properties of the composite material that could result from the presence of barrier layers of polymer, interspersed between the ends of particles of the filler component.

A second aspect of this present invention is an apparatus for the manufacture of composite materials with controlled spatial distribution comprising a receptacle capable of containing a fluid and two electrodes capable of relative movement whereby the first electrode is positioned at the base of the receptacle. The electrodes may comprise a series or array of electrically connected protrusions or needle-like conductors, but may equally comprise any other single shaped conductor or a plurality of such conductors such as flat plats, spheroids, cylinders, cones, tubes, carbon fibres. The configuration and the shape of the electrodes themselves then determine the location and the periodicity of the particle chains. One or both of the electrodes may be wholly or partially covered by an electrically insulating material.

The apparatus preferably further comprises a template containing at least one hole and more preferably a series or an array of holes. In use, this is immersed in the first component.

In a preferred embodiment, the first component and the second component each comprise at least one liquid either as a heterogeneous mixture of immiscible fluids or an emulsion. In this embodiment, the second component is dispersed in the form of droplets and the first component is a liquid polymer or liquid pre-polymer.

DETAILED DESCRIPTION OF THE INVENTION

Referring to FIG. 1, a chamber (10) contains a non-conducting or weakly conducting fluid (12) which is a pre-polymer of Epotek 302-3M (available from Epoxy Technologies, Bdlerica, Mass.,U.S.A.) and is the first component of the composite. The chamber also contains a supply of polarizable particles (11) in the form of short rods of PZT5A (available from CeraNova Corp., Fr Mass., U.S.A.) the second component of the composite. For clarity, the particles are depicted as being elongated rods. The particles are resting on a first electrode (20), which is made from any electrically conductive material. The fluid is an optically clear, two-part epoxy resin. Part A, which is based on diglycidyl ether of bisphenol-A (DGEBA) is mixed with Part B, which is a multi-functional aliphatic amine, according to the manufacturers' recommendation. Dissolved air is then removed by placing the mixture in a reduced pressure environment for around 30 minutes, at room temperature. A small increase in temperature, to 30° C., will facilitate this operation although it must be noted that the rate of the polymerization reaction is increased at higher temperature. The fluid is then transferred to the processing chamber. The rods are 130 microns in diameter and are of uniform length of 5 mm. (The diameter and length of the rods and their positioning is taken to be selectable in accordance with the intended application of the composite).

A template (30) is positioned some distance above the base electrode and is fully immersed in the fluid. The template is made from an electrically insulating material. In the template are a series or array of holes. Each hole has sides parallel in the plane of the figure and can have any desired shape in cross-section. Where the holes are circular in cross-section then they have a nominal diameter (d). The distance between the hole-centres is referred to as the periodicity (p).

A second electrode in the form of an array or series of needle-like structures (21-24) interconnected to form one integral electrode, protrudes through the holes in the template and into the fluid below the template. There is no restriction on the number of individual needles that may be used. Any of the individual needles or the first electrode or may not be covered totally or partially by a layer of an electrically insulating material as required. The inter-electrode gap (g) is the shortest distance between the second electrode and the first electrodes. The second electrode and the first electrode are connected to an a.c. power supply (50), which is controllable in respect of output voltage and frequency. A switch (51) is shown in the electrical circuit. Control over the electrical circuit is achieved by means of an external computer.

Figure 2A:
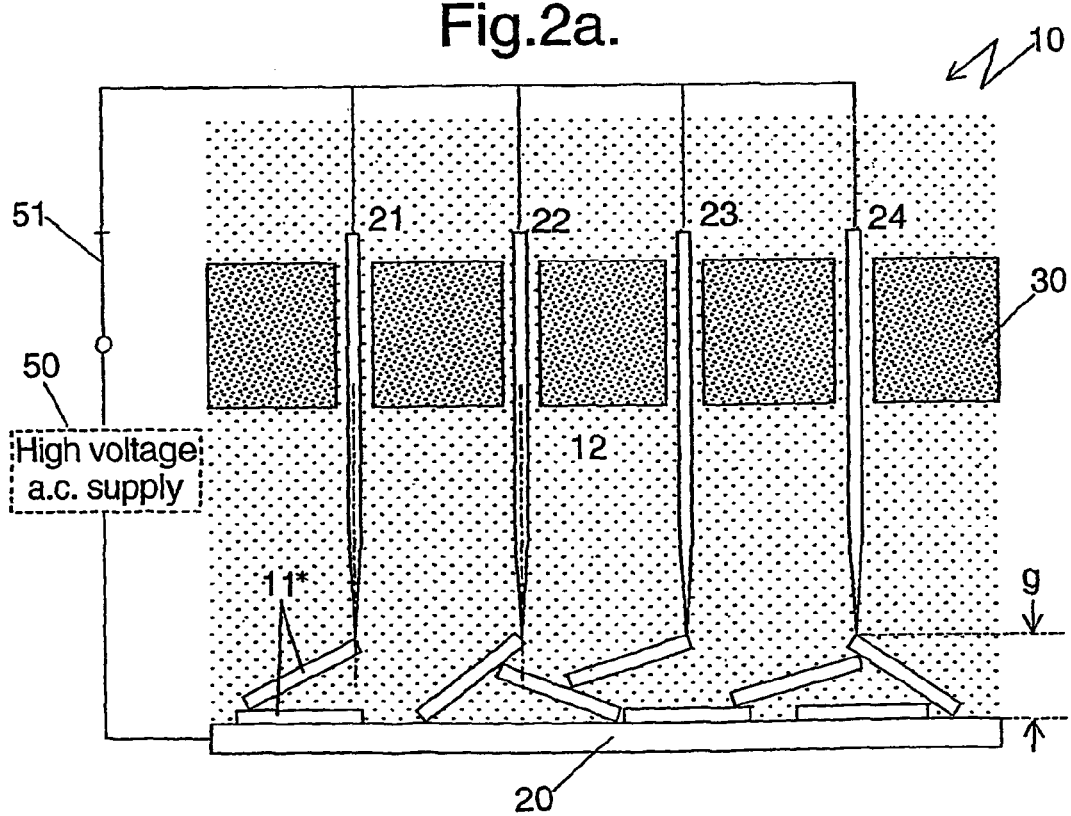
FIG. 2a—is a view of the FIG. 1 embodiment after an electric field is applied.

Referring to FIG. 2a, with the switch (51) closed the electrical circuit is energised and an a.c. electric field of a few volts per millimeter, at a frequency of 3 kHz, is applied across the inter-electrode gap. The electric field strength is then gradually increased so that the particles become polarized (11*) and a dielectrophoretic force is established between individual particles and between the particles and the electrodes. When the electric field strength exceeds around 250Vmm$^{-1}$, the particles move physically under the influence of the dielectrophoretic force and form prototype chain-like structures spanning the inter-electrode gap.

Figure 2B:
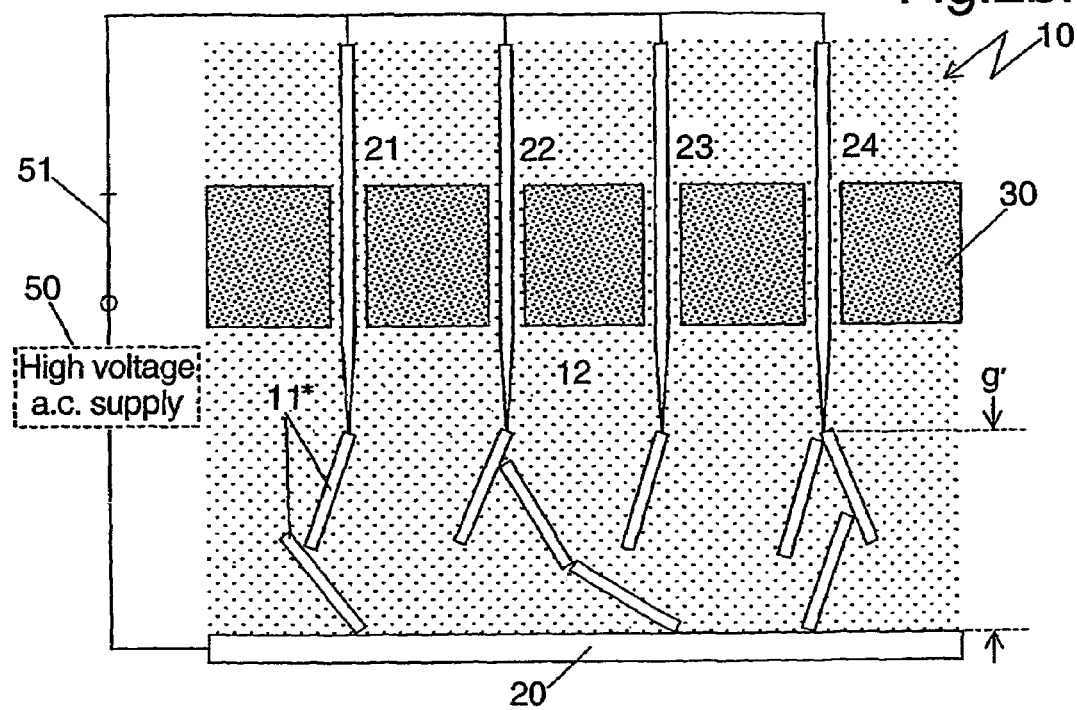

Referring to FIG. 2b, with the electric field applied the inter-electrode gap (g') is increased by moving the second electrode. The prototype chains of polarized particles (11*) remain coupled to the upper electrode structure by the dielectrophoretic force and are drawn along with it against the pull of gravity. The polarized particles cooperative such that the chain-like structures become more elongated in the direction of the applied field and localized where the field intensity is greatest. As the size of the inter-electrode gap increases, the chain-like structures are augmented by additional polarized particles that are drawn dielectrophoretically from the supply. And thus, the chains of particles increase in length. The potential difference (r.m.s.) between the electrodes can be increased to compensate for the increase in the number of particles on the chain to maintain adequate polarization of the particles. The rate of widening of the inter-electrode gap is limited to around 10 mm per minute. If the rate of widening is too fast then small fluid-filled gaps can develop between the polarized particles. The high electric field that pertains across such a gap can easily exceed the dielectric breakdown strength of the fluid. Where this occurs then small gas bubbles form that can cause unwanted porosity in the composite.

Figure 2C:
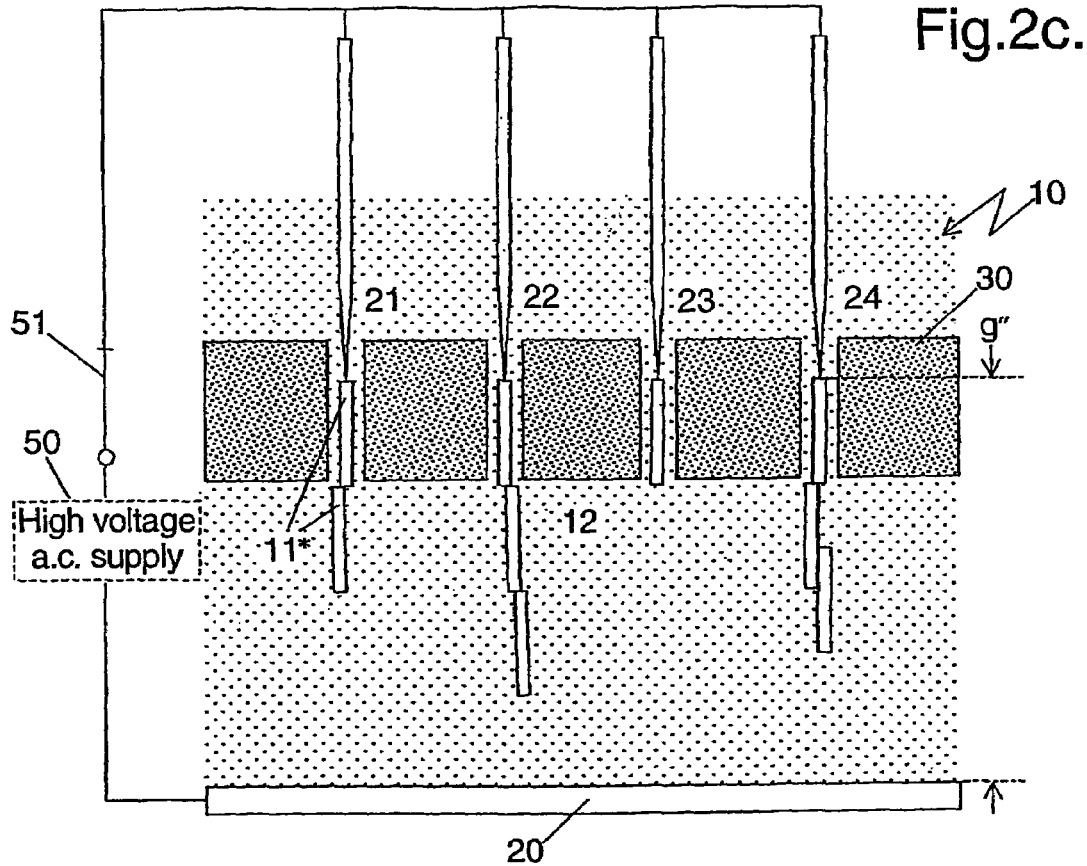
FIG. 2c—is a view of the FIG. 1 embodiment as the second electrode is withdrawn through the template. Thus it shows a stage in the processing sequence following that shown in FIG. 2b.

Referring to FIG. 2c, the size of the inter-electrode gap has been further increased (g"). Particle chains are drawn into holes located in the template. The size, shape and location of the holes are used to mould the particle chains into the required configuration. The chains may be further drawn out, through the holes, to any required length. Where there are insufficient particles available, the chains may not completely span the inter-electrode gap and may become detached from one or other electrode. Once the required length of chain has been drawn out, the pre-polymer is cured for a period of time at an elevated temperature. It must be noted that increasing the temperature of the resin changes its electrical properties. An intermediate increase in temperature to around 35° C. for 45 minutes could be used if needed. In particular, electrical conductivity is increased and this can affect polarization of the particles. A controlled external pressure may be applied to the fluid as an aid to processing. Externally applied pressure is commonly adopted in polymer processing as a means of restricting the formation of voids, which result from the presence of trapped gases or vapour. The resulting structured-composite material can be sectioned as required.

The present invention is not limited to the second component having particles of this shape. The switch for the electrical circuit may be a manual device or equally may be electronic.

Figure 3:
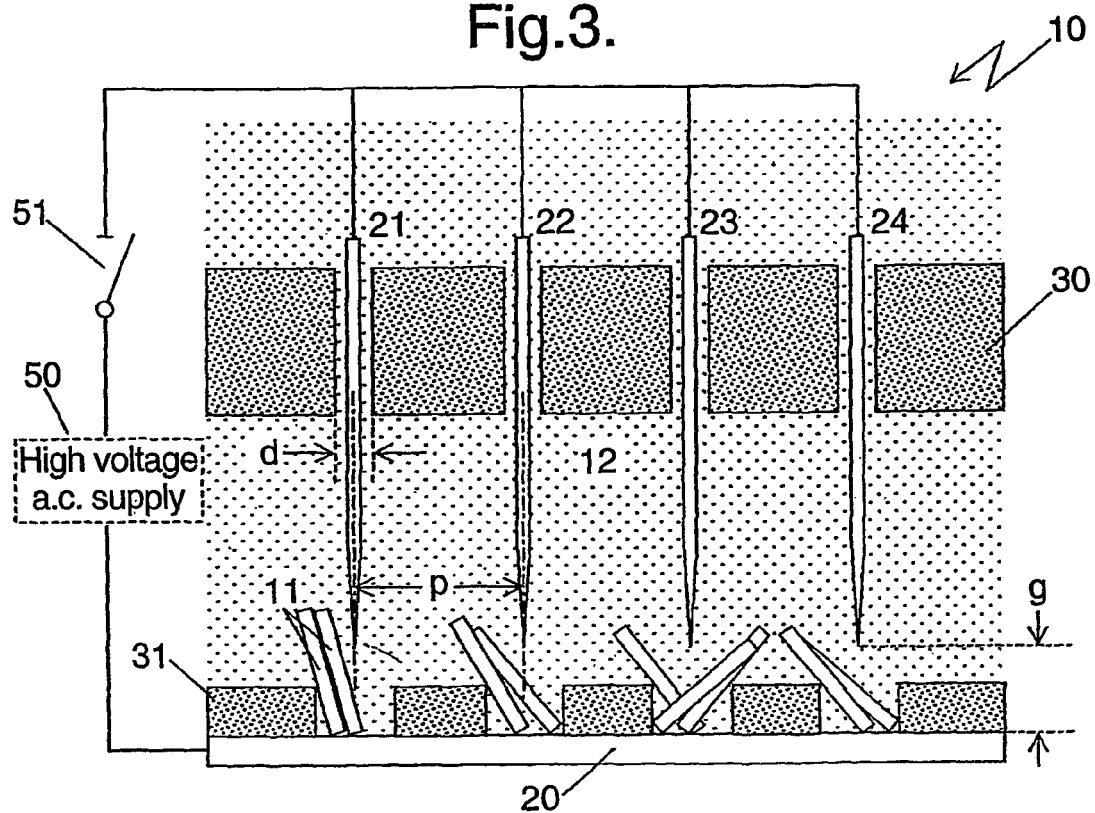
FIG. 3—is a schematic elevation illustrating an embodiment having a modification to the apparatus, immediately before an electric field is applied. The apparatus is similar to that shown in FIG. 1 with the addition of a device to pre-locate the filler particles as they rest on the base electrode.

Referring to FIG. 3, a further embodiment of the present invention is shown whereby a device (31) is added to the apparatus referred to in FIG. 1 that enables particles of a filler component to be pre-located on the base electrode as an aid to processing.

Figure 4:
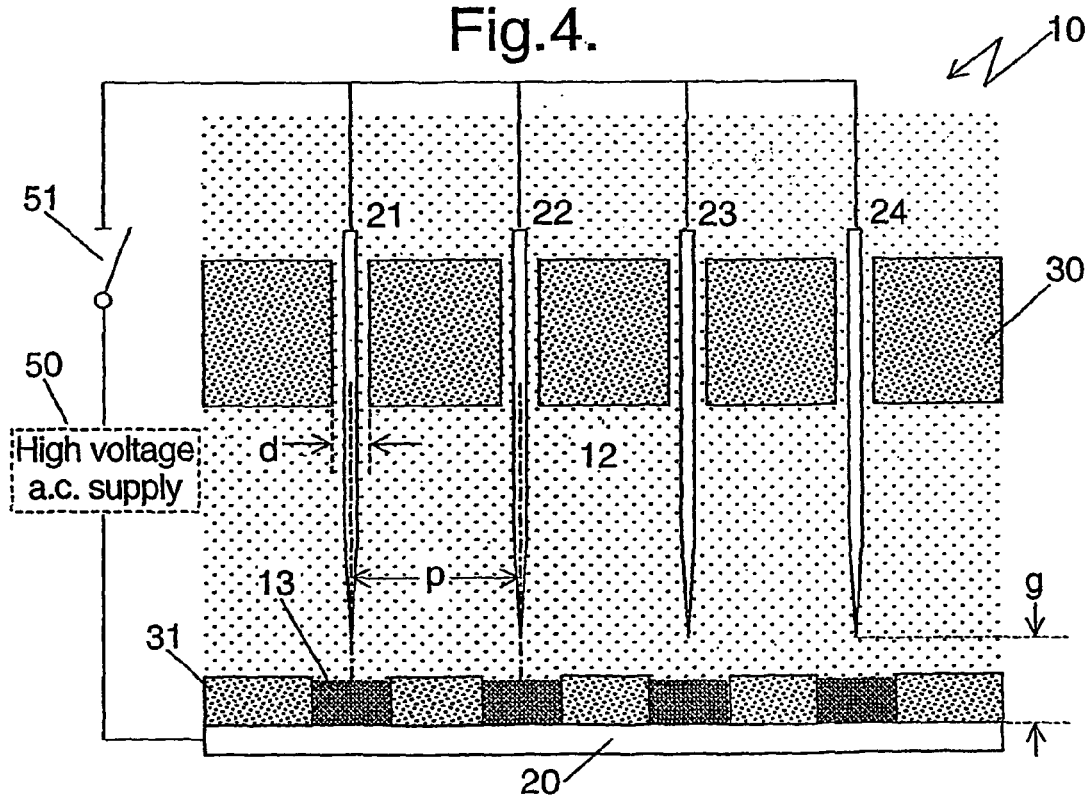
FIG. 4—is a schematic elevation illustrating a further embodiment of the present invention, immediately before an electric field is applied, having the addition of a device to pre-locate quantities of a second fluid resting on or adjacent to the base electrode.

Referring to FIG. 4, a further embodiment of the present invention is shown whereby a device (31) is added to the apparatus referred to in FIG. 1 that enables quantities of the second component as a fluid (13) to be pre-located on or adjacent to the base electrode.

Figure 5:
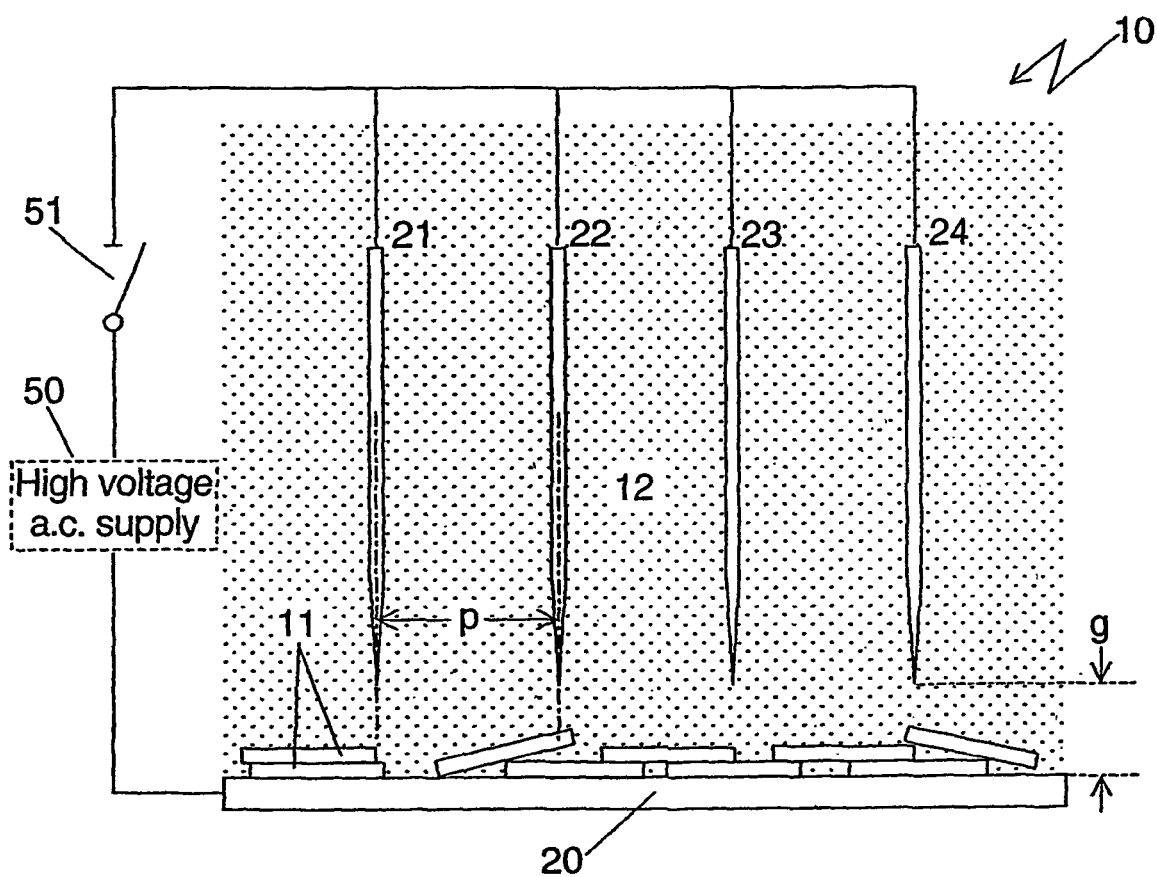
FIG. 5—is a schematic elevation illustrating an apparatus according to the present invention, immediately before an electric field is applied. The apparatus is similar to that shown in FIG. 1 but the template is absent.

Referring to FIG. 5, a further embodiment of the present invention is shown whereby the apparatus referred to in FIG. 1 can be used without a template situated intermediate to the electrodes. Physical movement of the electrodes is utilized, as before, to dictate the spatial redistribution of the finer component, but the precise control provided by the template is absent. The embodiments referred to in FIGS. 3 and 4 can also be practiced in this way.

The electric-field structured composite material can be sectioned as required and its thickness can be tailored by lapping or by grinding. A useful composite material, produced by this method, may incorporate the template, where particles of the finer component are fixed inside the series or array of holes. Otherwise, the useful material may be from the region above the template and comprise a series or array of particle chains held in a matrix. The location and periodicity of the chains is determined by the positioning of the template holes. In such a way the spatial distribution of the filler component within the matrix can be controlled.

It is within the scope of the present invention that the apparatus and methods described above can be used in conjunction with first components, such as liquid polymers or pre-polymers, containing more than one type of polarizable material. Useful materials for the second component include ferroelectric ceramics such lead zirconate titanate (PZT) and its derivatives, lead titanate, calcium-modified lead titanate, relax or ferroelectric ceramics, electrostrictive materials, electrical conductors such as carbon fibre, graphite, metals, electrical semiconductors and conductive organic polymers such as polyaniline, silicon carbide, silicon nitride, glass microspheres, glass fibres and alumina. Surface modification of the second component in the form of conductive or dielectric coatings can be used to enhance the polarizability of such materials for use with the apparatus and methods featured in the present invention. Furthermore, non-polarizable and weakly polarizable materials can also be included where these would impart useful properties to the composite.

Correct selection of the applied field frequency is critical to the success of the electric-field structuring technique. A first estimate of the frequency ($f_s$) at which chain-like structures form can be derived from the mathematical relationship:

$$f_s > \frac{(\sigma_p + 2\sigma_f)}{(\varepsilon_p + \varepsilon_f) \cdot \pi}$$

In this relationship, $\sigma_p$ and $\sigma_f$ denote the effective (ie. frequency dependent) conductivity of the particles and the fluid respectively; $\epsilon_p$ and $\epsilon_f$ denote the effective dielectric permittivity of the particles and the fluid respectively. If conductivity is expressed in Siemens per meter (Sm$^{-1}$) and dielectric permittivity is expressed in Farads per meter (Fm$^{-1}$) then the required frequency is given in cycles per second (Hz). A more precise estimate of the required field frequency can be gained through consideration of the complex polarizability parameter. The required field frequency (and also field strength) can also be determined experimentally through direct visual observation of the particles and fluid as the applied electric field conditions are varied. As a general rule, the effect of varying the applied field frequency should be assessed for each of the components present.

It is to be understood that the embodiments described above are illustrative of the principles of the present invention and that other embodiments and modifications of the invention may be readily devised in the light of this disclosure whilst still remaining within the scope of the invention disclosed herein.

The invention claimed is:

1. A method for manufacture of a composite material-comprising a filler material distributed in a matrix material, the method including the steps of:
   (a) adding a matrix composite component, comprising at least one non-conducting or weakly conducting fluid, to a receptacle;
   (b) adding a filler composite component, comprising at least one solid, liquid or gas capable of polarisation; wherein steps (a) and (b) are carried out in either order, resulting in a mixture of said components;
   (c) applying an alternating electric field across two electrodes immersed in the resultant mixture and wherein the two electrodes are moved relative to each other during the formation of the composite material.

2. A method according to claim 1 wherein one of the electrodes is located in a fixed position at a base of the receptacle.

3. A method according to claim 1 including providing means to pre-locate said filler component prior to applying the electric field, said means being immersed in the receptacle.

4. A method according to claim 1 including providing a template comprising at least one hole between the two electrodes.

5. A method according to claim 1 including means for applying an external pressure.

6. A method according to claim 1 wherein the matrix component is a polymerizable liquid.

7. A method according to claim 1 wherein the filler component consists of rods, filaments or fibers of ceramic, carbon, metal, semiconductor, glass, polymer.

8. A method according to claim 1 wherein the matrix component is a liquid pre-polymer of epoxy resin and the filler component consists of rods, filaments or fibers of lead zirconate titanate (PZT).

9. A method according to claim 1, in which method there is used apparatus comprising the receptacle capable of containing the fluid and the two electrodes, the two electrodes being separated by an inter-electrode gap being a shortest distance between the electrodes and being capable of relative movement to widen the inter-electrode gap, whereby one of the electrodes is located in a fixed position at a base of the receptacle to form a base electrode.

* * * * *